US012707171B2

(12) United States Patent
Higuchi et al.

(10) Patent No.: US 12,707,171 B2
(45) **Date of Patent: *Aug. 11, 2026**

(54) PHOTON COUNT IDENTIFICATION SYSTEM, PHOTON COUNT IDENTIFICATION METHOD, AND PHOTON COUNT IDENTIFICATION PROCESSING PROGRAM

(71) Applicant: HAMAMATSU PHOTONICS K.K., Hamamatsu (JP)

(72) Inventors: Takafumi Higuchi, Hamamatsu (JP); Teruo Takahashi, Hamamatsu (JP); Mao Nakajima, Hamamatsu (JP); Katsuhiro Nakamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 70 days.

This patent is subject to a terminal disclaimer.

(21) Appl. No.: 18/709,905

(22) PCT Filed: Nov. 10, 2022

(86) PCT No.: PCT/JP2022/041947
§ 371 (c)(1),
(2) Date: May 14, 2024

(87) PCT Pub. No.: WO2023/119933
PCT Pub. Date: Jun. 29, 2023

(65) Prior Publication Data

US 2025/0016475 A1 Jan. 9, 2025

(30) Foreign Application Priority Data

Dec. 24, 2021 (JP) ................................ 2021-211064

(51) Int. Cl.
*H04N 25/773* (2023.01)
*H04N 25/60* (2023.01)
(Continued)

(52) U.S. Cl.
CPC ......... *H04N 25/773* (2023.01); *H04N 25/616* (2023.01); *H04N 25/778* (2023.01)

(58) Field of Classification Search
CPC .. H04N 25/773; H04N 25/778; H04N 25/616; H04N 25/60; H04N 25/618; H04N 25/76; H10F 30/225; H10F 77/959
See application file for complete search history.

(56) References Cited

U.S. PATENT DOCUMENTS 12,513,432 B2 * 12/2025 Higuchi ............... H04N 25/618
2015/0333840 A1 * 11/2015 Bennett ................... H01S 5/041 398/65

(Continued)

FOREIGN PATENT DOCUMENTS

JP 2017-167551 A 9/2017
JP 2020-038129 A 3/2020

(Continued)

OTHER PUBLICATIONS

Eric Fossum, "Modeling the Performance of Single-Bit and Multi-Bit Quanta Image Sensors"—IEEE J. of Electron Devices Society, vol. 1, No. 9, pp. 166-174—Sep. 2013. (Year: 2013).*

(Continued)

*Primary Examiner* — Marly S Camargo
(74) *Attorney, Agent, or Firm* — Faegre Drinker Biddle & Reath LLP

(57) ABSTRACT

A photon number resolving system includes: a plurality of pixels of which each includes a photoelectric conversion element and an amplifier for amplifying the electric charges converted by the photoelectric conversion element and con- (Continued)

verting the electric charges to a voltage; an A/D converter configured to convert a voltage output from the amplifier of each of the plurality of pixels to a digital value; a first deriving unit configured to derive a provisional value of a photon number in each pixel of the plurality of pixels based on the digital value; and a second deriving unit configured to derive a confirmed value of a photon number in a target pixel based on a first probability based on optical shot noise and a second probability based on reading noise.

14 Claims, 6 Drawing Sheets

(51) Int. Cl.

| | |
|---|---|
| ***H04N 25/616*** | (2023.01) |
| ***H04N 25/618*** | (2023.01) |
| ***H04N 25/76*** | (2023.01) |
| ***H04N 25/778*** | (2023.01) |
| ***H10F 30/225*** | (2025.01) |

(56) References Cited

U.S. PATENT DOCUMENTS

| | | | | |
|---|---|---|---|---|
| 2019/0385280 | A1 | 12/2019 | Huang et al. | |
| 2020/0371261 | A1* | 11/2020 | Maruno | G01J 1/44 |
| 2023/0324570 | A1* | 10/2023 | Maruno | H04N 25/778 |
| 2024/0314470 | A1* | 9/2024 | Higuchi | H04N 25/618 |
| 2025/0016476 | A1* | 1/2025 | Higuchi | H04N 25/60 |

FOREIGN PATENT DOCUMENTS

| | | | |
|---|---|---|---|
| JP | 2020-096646 | A | 6/2020 |
| JP | 2021-182751 | A | 11/2021 |
| WO | WO-2019/102636 | A1 | 5/2019 |
| WO | WO-2019/102637 | A1 | 5/2019 |
| WO | 2022/185691 | A1 | 9/2022 |

OTHER PUBLICATIONS

English-language translation of International Preliminary Report on Patentability (IPRP) dated Jul. 4, 2024 that issued in WO Patent Application No. PCT/JP2022/041947.

B. Saleh Masoodian et al., “A 1Mjot 1040fps 0.22e-rms Stacked BSI Quanta Image Sensor with Cluster-Parallel Readout”, 2017 International Image Sensor Workshop (IISW), May 30-Jun. 2, 2017, p. 230-p. 233.

Jia Ju Ma et al., “Photon-number-resolving megapixel image sensor at room temperature without avalanche gain”, Optica, vol. 4, No. 12, Dec. 2017, p. 1474-p. 1481.

Dakota A. Starkey et al., Determining Conversion Gain and Read Noise Using a Photon-Counting Histogram Method for Deep Sub-Electron Read Noise Image Sensors, Journal of the Electron Devices Society, vol. 4, No. 3, May 2016, p. 129-p. 135.

Sehyun Kwak et al, “Bayesian electron density inference from JET lithium beam emission spectra using Gaussian processes”, arxiv.org, Cornell University Library, 201Olin Library Cornell University Ithaca, NY14853 DOI: 10.1088/1741-4326/AA5072, Sep. 13, 2016, p. 1-p. 18, XP080726231.

Gert Finger et al, “Performance evaluation and calibration issues of large format infrared hybrid active pixel sensors used for ground- and space-based astronomy”, Nuclear Instruments&Methods in Physics Research. Section A,Elsevier BV*North-Holland,NL,vol. 565,No. 1 DOI:10.1016/J.NIMA.2006.05.005, Sep. 1, 2006, p. 241-p. 250, XP005608346.

European Search Report issued on September 5, 2025 in corresponding European patent application 22910652.1.

* cited by examiner

1
COMPUTER
20
STORAGE UNIT
21
PROVISIONAL VALUE DERIVING UNIT
22a
CONFIRMED VALUE DERIVING UNIT
22b
22
DATA PROCESSING UNIT
23
CONTROL UNIT
24
DISPLAY DEVICE
25
INPUT DEVICE
26
10
A/D
CDS
15
17
13
12
11
14
16

(a)

(b)

PHOTON COUNT IDENTIFICATION SYSTEM, PHOTON COUNT IDENTIFICATION METHOD, AND PHOTON COUNT IDENTIFICATION PROCESSING PROGRAM

TECHNICAL FIELD

The present disclosure relates to a photon number resolving system, a photon number resolving method, and a photon number resolving processing program.

BACKGROUND ART

For example, a photon number resolving device using a complementary metal oxide semiconductor (CMOS) image sensor is described in Patent Literature 1 and Patent Literature 2. In this device, when photons are input to a photoelectric conversion element, photoelectrons generated based on the number of input photons are accumulated as electric charges. The electric charges accumulated in the photoelectric conversion element are converted to a voltage which is amplified by an amplifier. A voltage output from the amplifier is converted to a digital value by an A/D converter. In the photon number resolving device, the number of photons in a pixel of the image sensor is determined based on the digital value output from the A/D converter.

A technique of photon counting using a CMOS image sensor is described in Non-Patent Literatures 1 to 3.

CITATION LIST

Patent Literature

[Patent Literature 1] PCT International Publication No. WO2019/102636

[Patent Literature 2] PCT International Publication No. WO2019/102637

[Non-Patent Literature 1] B. Saleh Masoodian, Jiaju Ma, Dakota Starkey, Yuichiro Yamashita, and Eric R. Fossum, "A 1 Mjot 1040 fps 0.22 e-rms Stacked BSI Quanta Image Sensor with Cluster-Parallel Readout," 2017 International Image Sensor Workshop (IISW) Proceedings, May 30-Jun. 2, 2017, P 230-233

[Non-Patent Literature 2] JIAJU M A et al., "Photon-number-resolving megapixel image sensor at room temperature without avalanche gain," Optica, Vol. 4, No. 12, December 2017, p 1474-p 1481

[Non-Patent Literature 3] DAKOTA A. STARKEY et al., "Determining Conversion Gain and Read Noise Using a Photon-Counting Histogram Method for Deep Sub-Electron Read Noise Image Sensors," JOURNAL OF THE ELECTRON DEVICES SOCIETY, VOLUME 4, NO. 3, May 2016, p 129-p 135

SUMMARY OF INVENTION

Technical Problem

When photon number resolving is performed using the CMOS image sensor, reading noise which is random noise is generated in the amplifier at the time of reading the voltage amplified by the amplifier. When the reading noise is large, a probability distribution of the number of photoelectrons observed is broad. Accordingly, it is preferable that reading noise of each pixel be small. However, when the CMOS image sensor is manufactured, reading noise of pixels may fluctuate in a fixed range. In this case, there is concern about a decrease in counting accuracy of photons in a pixel with large reading noise.

An aspect of the present disclosure provides a photon number resolving system that can curb a decrease in counting accuracy of photons.

Solution to Problem

A photon number resolving system according to an aspect includes: a plurality of pixels of which each includes a photoelectric conversion element for converting input light to electric charges and an amplifier for amplifying the electric charges converted by the photoelectric conversion element and converting the electric charges to a voltage; an A/D converter configured to convert a voltage output from the amplifier to a digital value; a first deriving unit configured to derive a provisional value of a photon number in each of the plurality of pixels based on the digital value; and a second deriving unit configured to derive a confirmed value of a photon number in a target pixel which is one of the plurality of pixels based on a first probability and a second probability. The first probability is an observation probability for each photoelectron number in the target pixel based on a probability distribution of the photon number. The probability distribution of the photon number is derived based on the digital value when the light is input to a reference pixel which is at least one of the plurality of pixels. The second probability is an observation probability for each photoelectron number at the provisional value of the target pixel based on a probability distribution of a photoelectron number accompanying reading noise in the target pixel.

In the photon number resolving system, the first deriving unit derives the provisional value of the photon number in each pixel based on the magnitude of the digital value corresponding to an amount of electric charges generated in the corresponding pixel. For example, in a pixel with large reading noise, an error included in the derived provisional value may increase. The second deriving unit derives the confirmed value of the photon number when the target pixel indicates the provisional value based on a probability distribution of the photon number derived based on the digital value of the reference pixel and the probability distribution of the photoelectron number accompanying the reading noise. In this way, the confirmed value of the photon number is derived in consideration of the magnitude of the reading noise in the target pixel. Accordingly, since an influence of the reading noise on deriving of the confirmed value can be decreased, it is possible to improve accuracy of photon number resolving.

For example, in the photon number resolving system, the reading noise of the reference pixel may be smaller than an average of the reading noise of all the plurality of pixels. With this configuration, since the digital value of the reference pixel reflects the photon number with relatively high accuracy, it is possible to enhance reliability of the probability distribution of the photon number.

For example, in the photon number resolving system, the reading noise of the reference pixel may be equal to or less than 0.8 e-rms. With this configuration, since the digital value of the reference pixel reflects the photon number with relatively high accuracy, it is possible to enhance reliability of the probability distribution of the photon number.

For example, in the photon number resolving system, the light may be output from a quantum light source. With this configuration, the first probability reflects characteristics of the quantum light source.

For example, in the photon number resolving system, the second deriving unit may calculate a probability for each photoelectron number when the target pixel indicates the provisional value using a product of the first probability and the second probability and determine the confirmed value based on the calculated probability. With this configuration, it is possible to obtain a most probable photon number by using the photoelectron number with a maximum value of the probability for each photoelectron number when the target pixel indicates the provisional value as the confirmed value. By using an expected value of the photoelectron number when the target pixel indicates the provisional value as the confirmed value, it is possible to obtain the photon number of which an error from a true photon number is minimized.

For example, in the photon number resolving system, a probability distribution of the photoelectron number accompanying the reading noise of the target pixel may be a normal distribution. With this configuration, the probability distribution of the photoelectron number accompanying the reading noise can be appropriately described.

For example, in the photon number resolving system, the second deriving unit may include a noise map indicating the reading noise of each of the plurality of pixels. That is, the second deriving unit can derive the second probability with reference to data including the noise map.

A photon number resolving method according to an example includes: deriving a provisional value of a photon number in each of a plurality of pixels based on digital values corresponding to the plurality of pixels output from a two-dimensional image sensor including the plurality of pixels; and deriving a confirmed value of the photon number in a target pixel which is one of the plurality of pixels based on a first probability and a second probability. The deriving of the confirmed value includes calculating an observation probability for each photoelectron number in the target pixel based on a probability distribution of the photon number as the first probability, and calculating an observation probability for each photoelectron number at the provisional value of the target pixel as the second probability based on a probability distribution of the photoelectron number accompanying the reading noise of the target pixel. The probability distribution of the photon number is derived based on the digital value when light is input to a reference pixel which is at least one of the plurality of pixels.

In the photon number resolving method, the provisional value of the photon number in each pixel may be derived based on the magnitude of the digital value corresponding to an amount of electric charges generated in the corresponding pixel. For example, in a pixel with large reading noise, an error included in the derived provisional value may increase. The confirmed value of the photon number when the target pixel indicates the provisional value based on a probability distribution of the photon number derived based on the digital value of the reference pixel and the probability distribution of the photoelectron number accompanying the reading noise. In this way, the confirmed value of the photon number is derived in consideration of the magnitude of the reading noise in the target pixel. Accordingly, since an influence of the reading noise on deriving of the confirmed value can be decreased, it is possible to improve accuracy of photon number resolving.

For example, in the photon number resolving method, the reading noise of the reference pixel may be smaller than an average of the reading noise of all the plurality of pixels. With this configuration, since the digital value of the reference pixel reflects the photon number with relatively high accuracy, it is possible to enhance reliability of the probability distribution of the photon number.

For example, in the photon number resolving method, the reading noise of the reference pixel may be equal to or less than 0.8 e-rms. With this configuration, since the digital value of the reference pixel reflects the photon number with relatively high accuracy, it is possible to enhance reliability of the probability distribution of the photon number.

For example, in the photon number resolving method, the light may be output from a quantum light source. With this configuration, the first probability reflects characteristics of the quantum light source.

For example, in the photon number resolving method, the deriving of the confirmed value may include calculating a probability for each photoelectron number when the target pixel indicates the provisional value using a product of the first probability and the second probability and determining the confirmed value based on the calculated probability. With this configuration, it is possible to obtain a most probable photon number by using the photoelectron number with a maximum value of the probability for each photoelectron number when the target pixel indicates the provisional value as the confirmed value. By using an expected value of the photoelectron number when the target pixel indicates the provisional value as the confirmed value, it is possible to obtain the photon number of which an error from a true photon number is minimized.

For example, in the photon number resolving method, the deriving of the confirmed value may use a normal distribution as a probability distribution of the photoelectron number accompanying the reading noise of the target pixel. With this configuration, the probability distribution of the photoelectron number accompanying the reading noise can be appropriately described.

For example, in the photon number resolving method, the deriving of the confirmed value may include referring to a noise map indicating the reading noise of each of the plurality of pixels. For example, the second probability can be derived with reference to data including the noise map.

A photon number resolving program according to an example causes a computer to perform a process of resolving a photon number based on digital values corresponding to a plurality of pixels output from a two-dimensional image sensor including the plurality of pixels. The program causes the computer to perform: a first deriving process of deriving a provisional value of a photon number in each of a plurality of pixels based on the digital values; and a second deriving process of deriving a confirmed value of the photon number in a target pixel which is one of the plurality of pixels based on a first probability and a second probability. The first probability is an observation probability for each photoelectron number in the target pixel based on a probability distribution of the photon number. The probability distribution of the photon number is derived based on the digital value when the light is input to a reference pixel which is at least one of the plurality of pixels. The second probability is an observation probability for each photoelectron number at the provisional value of the target pixel based on a probability distribution of a photoelectron number accompanying reading noise in the target pixel.

Advantageous Effects of Invention

With the photon number resolving system and the photon number resolving method according to the aspect of the present disclosure, it is possible to curb a decrease in counting accuracy of photons.

DESCRIPTION OF EMBODIMENTS

Hereinafter, an embodiment will be specifically described with reference to the accompanying drawings. For the purpose of convenience, the substantially same elements will be referred to by the same reference signs and description thereof may be omitted. In the following description, photon number resolving includes counting photoelectrons generated in each pixel of an image sensor or counting photons incident on each pixel of an image sensor. Photon number resolving includes detecting photoelectrons generated in each pixel of an image sensor or detecting photons incident on each pixel of an image sensor similarly to general single photon counting. A photon number resolving result (photon number resolving data) includes statistical data indicating the number of photoelectrons or the number of photons. The photon number resolving result includes an image indicating the number of photoelectrons or the number of photons in each pixel. This image may be a two-dimensional image or a one-dimensional image. Photon number resolving includes counting the number of photons in consideration of quantum efficiency (QE) of an image sensor.

Figure 1:
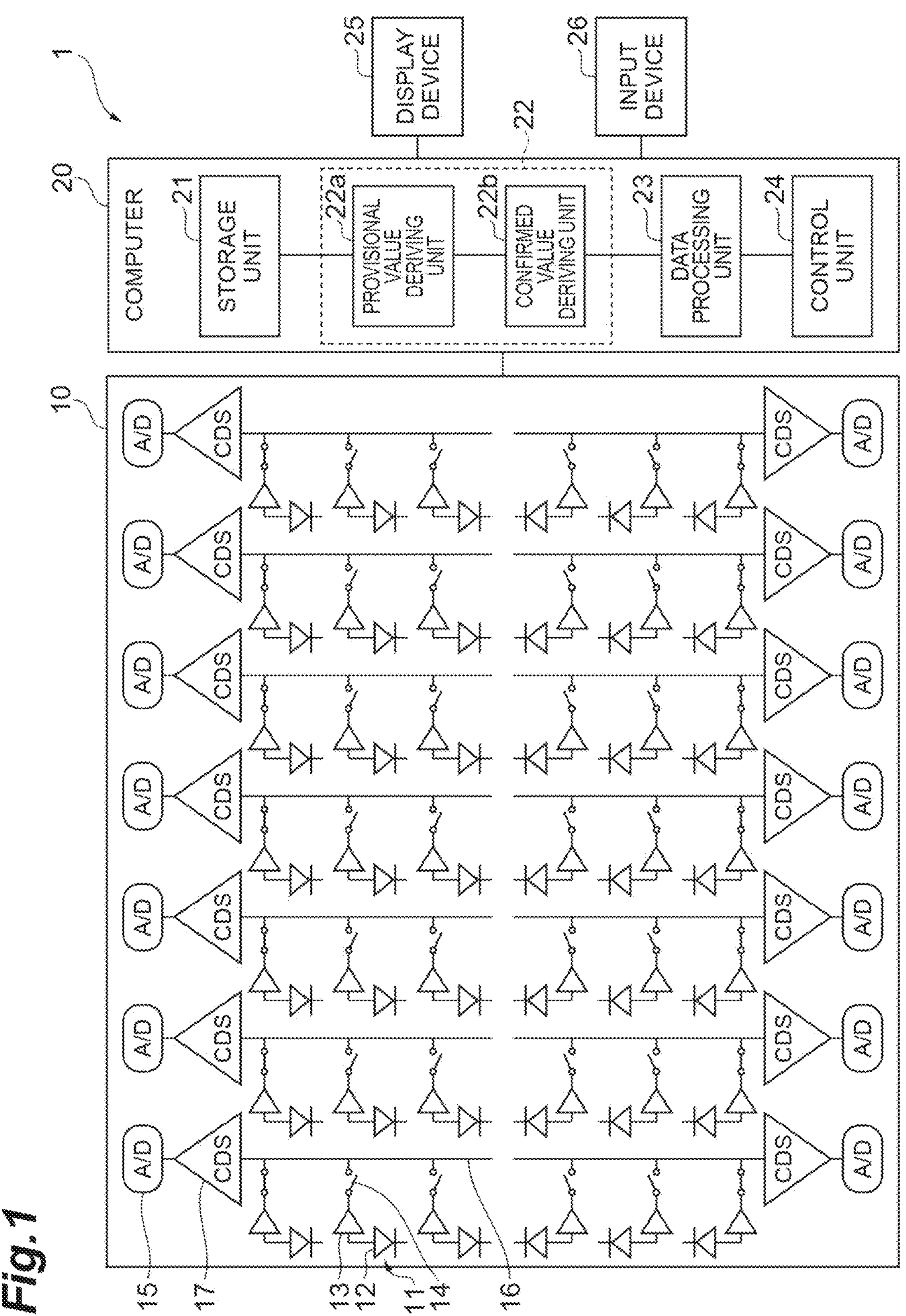
FIG. 1 is a diagram illustrating a configuration of a photon number resolving device according to an example.
Figure 2:
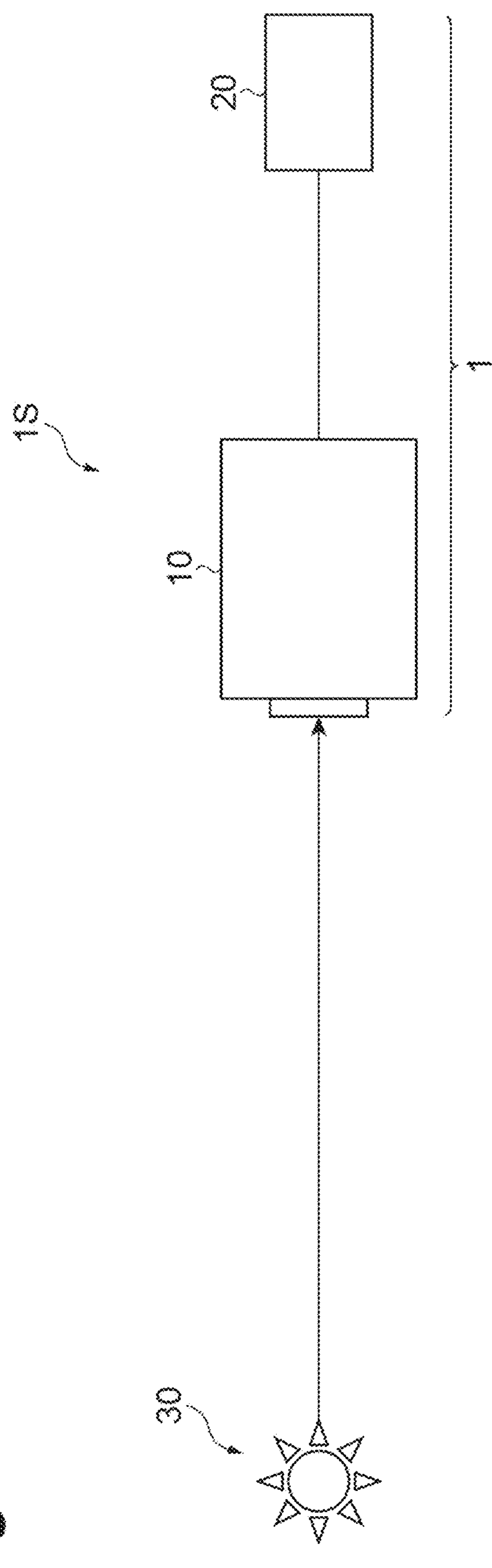
FIG. 2 is a block diagram illustrating a photon number resolving system according to an example.

FIG. 1 is a diagram illustrating a configuration of a photon number resolving device according to an example. FIG. 2 is a block diagram illustrating a photon number resolving system including the co device according to an example. As illustrated in FIG. 1, a photon number resolving device according to an example includes a CMOS image sensor 10 which is a two-dimensional image sensor and a computer (a control device) 20 connected to the CMOS image sensor 10. As illustrated in FIG. 2, a photon number resolving system SI includes a light source 30 that applies light to the CMOS image sensor 10 of the photon number resolving device 1. In the photon number resolving system, image data can be acquired by the photon number resolving device 1 in a state in which light output from the light source 30 is input to the CMOS image sensor 10. For example, the light source 30 may be a quantum light source which can be used as a single photon source, a quantum entanglement photon source, or the like. The type of the light source 30 is not particularly limited, and a laser light source, an LED light source, a thermal light source, or the like may be used.

The CMOS image sensor 10 includes a plurality of pixels 11 and an A/D converter 15. The plurality of pixels 11 are two-dimensionally arranged. That is, the plurality of pixels 11 are arranged in a row direction and a column direction. Each pixel 11 includes a photodiode (a photoelectric conversion element) 12 and an amplifier 13. The photodiode 12 accumulates photoelectrons generated in response to inputting of photons as electric charges. The amplifier 13 converts the electric charges accumulated in the photodiode 12 to a voltage and amplifies the converted voltage. The amplified voltage is transferred to a vertical signal line 16 for each line (for each row) by switching a selection switch 14 of the corresponding pixel 11. A correlated double sampling (CDS) circuit 17 is provided in each vertical signal line 16. The CDS circuit 17 removes noise that varies between pixels, and temporarily stores the transferred voltage.

The A/D converter 15 converts the voltage output from the amplifier 13 of each of the plurality of pixels 11 to a digital value. The A/D converter 15 may be provided in each pixel 11. In this embodiment, the A/D converter 15 converts the voltage stored in the CDS circuit 17 to a digital value. The converted digital values are output to the computer 20. For example, the digital values may be sent to a horizontal signal line which is not illustrated by switching a selected column and output to the computer 20. In this way, the CMOS image sensor 10 outputs a digital value corresponding to the number of input photons (the number of generated photoelectrons) to the computer 20 when photons are input to each pixel 11. When the voltage amplified by the amplifier 13 is read, reading noise which is random noise is generated in the amplifier 13.

The computer 20 physically includes a storage device such as a RAM and a ROM, a processor (an arithmetic operation circuit) such as a CPU and a GPU, and a communication interface. For example, a personal computer, a cloud server, a smart device (such as a smartphone or a tablet terminal), a microcomputer, or a field-programmable gate array (FPGA) can be used as the computer 20. The computer 20 serves as a storage unit 21, a conversion unit 22, a data processing unit 23, and a control unit 24 by causing the processor of a computer system to execute a program stored in the storage device. The computer 20 may be provided inside of a camera device including the CMOS image sensor 10 or provided outside of the camera device. A display device 25 and an input device 26 may be connected to the computer 20. The display device 25 is, for example, a display that can display a result of photon number resolving acquired by the computer 20. The input device 26 may be a keyboard, a mouse, or the like for allowing a user to input measurement conditions. The display device 25 and the input device 26 may be provided as a touch screen. The display device 25 and the input device 26 may be included in the computer 20. The display device 25 and the input device 26 may be provided in the camera device including the CMOS image sensor 10.

The storage unit 21 stores data for converting a digital value output from the CMOS image sensor 10 to the number of photons. For example, the storage unit 21 includes an auxiliary storage device such as a solid state drive or a hard disk drive in addition to the storage device such as a RAM and a ROM. For example, the storage unit 21 stores a gain and an offset value in each of the plurality of pixels 11 as a lookup table. The storage unit 21 may store reading noise in each of the plurality of pixels 11 as a lookup table (a noise map).

A digital value [DN] output from the A/D converter 15 is expressed by following Expression (1). Accordingly, the offset value [DN] is expressed as a digital value output in a state in which light is not input thereto. Therefore, for example, a plurality of digital values are acquired from a plurality of frames of dark images acquired by the CMOS image sensor 10 in a state in which light is not input thereto, and the offset value is acquired by averaging the acquired digital values for each pixel 11. When a gain [DN/e] of each pixel 11 is acquired, a plurality of frames of images are acquired by the CMOS image sensor 10 with a sufficient light intensity. An average optical signal value S [SN] and a standard deviation N [DN] of the digital values for each pixel 11 are acquired. Since the gain is expressed by $N^2/S$, the gain is derived from the average optical signal value S and the standard deviation N.

[Math. 1]

$$\text{Digital value} = \text{gain} \times \text{number of photoelectrons } [e] + \text{offset value} \quad (1)$$

Reading noise is defined as fluctuation of a digital value and can be expressed, for example, as a value acquired by conversion in the units of electrons. Therefore, reading noise for each pixel 11 may be acquired by acquiring a standard deviation of digital values for each pixel 11 in a plurality of (for example, 100 or more frames) dark images and dividing the acquired standard deviation by the gain of the corresponding pixel 11. The offset value, the gain, and the reading noise of each pixel may be acquired in the course of manufacturing the photon number resolving device.

The conversion unit 22 converts the digital value for each of the plurality of pixels 11 output from the A/D converter 15 to the number of photoelectrons or the number of photons with reference to a table stored in the storage unit 21. For example, the number of photons can be acquired by dividing the number of photoelectrons for each pixel 11 by quantum efficiency. When the quantum efficiency is 100%, the number of photoelectrons and the number of photons are the same.

The data processing unit 23 prepares a two-dimensional image or a one-dimensional image indicating the number of photos in each pixel 11 based on a value of the number of photons output from the conversion unit 22. For example, the two-dimensional image or the one-dimensional image may be an image in which pixels are displayed in luminance corresponding to the number of photons. The prepared image can be output to the display device 25. The data processing unit 23 may prepare statistical data such as a histogram which is a plot of the number of pixels with respect to the number of photons. The control unit 24 can comprehensively control the functional units of the computer 20 or the CMOS image sensor 10.

The conversion unit 22 will be described below in detail. The conversion unit 22 can appropriately acquire the gain, the offset value, and the reading noise of each pixel 11 with reference to the lookup table stored in the storage unit 21.

For example, the conversion unit 22 includes a provisional value deriving unit 22*a* (a first deriving unit) and a confirmed value deriving unit 22*b* (a second deriving unit). The provisional value deriving unit 22*a* derives a provisional value of the number of photons for each pixel 11 of a plurality of pixels 11 based on the digital value. The provisional value deriving unit 22*a* may derive the number of photoelectrons acquired by dividing a value obtained by subtracting the offset value from the measured digital value by the gain as the provisional value of the number of photons (a first provisional value) for each pixel 11 as in following Expression (2). In the following description, the first provisional value may be referred to as a pixel value.

[Math. 2]

$$\text{Pixel value} = ((\text{digital value} - \text{offset value}) / \text{gain}) \quad (2)$$

The provisional value deriving unit 22*a* may derive an integer value of the number of photons estimated from the pixel value as a provisional value (a second provisional value). In the following description, the second provisional value may be referred to as a provisional photon number. For example, the provisional photon number may be acquired by rounding off the pixel value to a close integer. In this case, the pixel value may be converted to the provisional photon number by setting a predetermined threshold value range for the pixel value. For example, a threshold value range of a pixel value corresponding to 5 photons (5 photoelectrons) is equal to or greater than 4.5 e and less than 5.5 e.

The confirmed value deriving unit 22*b* derives (determines) a confirmed value of the number of photons in each of the plurality of pixels 11. For example, the confirmed value deriving unit 22*b* sets one of the plurality of pixels 11 as a target pixel and derives a confirmed value of the number of photons in the target pixel. By setting each of the plurality of pixels 11 constituting the CMOS image sensor 10 as a target pixel, confirmed values of the numbers of photons in all the pixels are derived.

In this embodiment, the confirmed value deriving unit 22*b* derives a first probability and a second probability and derives a confirmed value of a photon number in a target pixel based on the derived first probability and the derived second probability. The first probability is an observation probability for each photoelectron number in the target pixel based on a probability distribution of the photon number. The probability distribution of the photon number is derived by the confirmed value deriving unit 22*b* based on a digital value of a reference pixel when light from the light source 30 is input to the reference pixel. The reference pixel is at least one pixel of the plurality of pixels 11 constituting the CMOS image sensor 10. For example, the reading noise of the reference pixel may have a value smaller than an average of the reading noise of all the plurality of pixels 11. In this case, the provisional value calculated from the digital value of the reference pixel can reflect the photon number with higher accuracy in comparison with the provisional value of a pixel with average reading noise. For example, the reading noise of the reference pixel may be equal to or less than a predetermined value. For example, the reading noise of the reference pixel may be equal to or less than 0.8 [e-rms]. When it is intended to acquire a more accurate probability distribution of the photon number, only a pixel 11 of which reading noise is equal to or less than 0.3 [e-rms] may be used as the reference pixel.

For example, the storage unit 21 may store address information of some or all of the pixels 11 with reading noise suitable for the reference pixel. In this case, the confirmed value deriving unit 22*b* can identify the reference pixel with reference to the address information in the storage unit 21. Accordingly, the confirmed value deriving unit 22*b* can appropriately acquire output data such as a digital value, a pixel value, and a provisional photon number of the reference pixel. When address information of the reference pixel is not stored in the storage unit 21, the confirmed value deriving unit 22*b* may extract output data of a pixel (that is, a reference pixel) with reading noise suitable for the reference pixel with reference to the reading noise of the pixels (a noise map).

For example, the confirmed value deriving unit 22*b* may derive a probability distribution of the photon number based on outputs data of a plurality of reference pixels. For example, the output data of the plurality of reference pixels is acquired in a state in which light of a uniform light intensity from the light source 30 is input to the plurality of reference pixels. When light of a uniform light intensity from the light source 30 is input to all the pixels 11 of the CMOS image sensor 10, all the reference pixels may be used to derive the probability distribution of the photon number. When light of a uniform light intensity from the light source 30 is input to pixels 11 in a partial area including the target pixel in the CMOS image sensor 10, only the reference pixels included in the partial area may be used to derive the probability distribution of the photon number.

For example, the confirmed value deriving unit 22*b* acquires data of a plurality of pieces of data of the provisional photon number corresponding to each of the plurality of reference pixels. Then, the confirmed value deriving unit 22*b* derives a probability distribution of the photon number by statistically processing the acquired plurality of pieces of data of the provisional photon number. That is, the confirmed value deriving unit 22*b* derives a probability distribution indicating an observation probability for each provisional photon number (that is, a probability distribution of the photon number) by counting the acquired pieces of data of the provisional photon number for each provisional photon number and dividing the counting result by the total number of pieces of data. The confirmed value deriving unit 22*b* acquires a first probability based on the probability distribution. The first probability is a probability with which the photon number of the target pixel is observed to be k when uniform light under the same conditions as when the probability distribution of the photon number is acquired is input to the target pixel. That is, the confirmed value deriving unit 22*b* acquires a probability when the photon number is k as the first probability from the probability distribution of the photon number. The photon number k is a provisional photon number assumed by the confirmed value deriving unit 22*b*. That is, the photon number k can be said to be a provisional value (a third provisional value) of the photon number in the target pixel. In the following description, the third provisional value may be referred to as an assumed a provisional photon number.

When the probability distribution of the photon number is derived, a result with higher accuracy can be obtained as the number of pieces of data of the provisional photon number becomes larger, that is, as the sample size becomes larger. Therefore, the confirmed value deriving unit 22*b* may acquire data of the provisional photon number corresponding to a plurality of frames and derive the probability distribution of the photon number based on the acquired data.

The second probability is an observation probability for each photoelectron number with the provisional value of the target pixel based on the probability distribution of the photoelectron number accompanying the reading noise of the target pixel and is expressed by following Expression (3). The provisional value of the target pixel may be a pixel value. As represented by Expression (3), the second probability complies with a normal distribution (a Gaussian distribution). In Expression (3), x is a pixel value [e] of the target pixel, and R is reading noise [e-rms] of the target pixel. That is, the second probability is a probability (an observation probability) with which the photon number of the target pixel is observed to be k in the pixel value of the target pixel and is calculated for each photoelectron number.

[Math. 3]

$$\text{Second probability} = \frac{1}{\sqrt{2\pi}R}\exp\left(-\frac{(x-k)^2}{2R^2}\right) \tag{3}$$

The confirmed value deriving unit 22*b* calculates a probability for each photoelectron number when the target pixel indicates the provisional value based on a product of the first probability and the second probability and determines a confirmed value of the photon number based on the calculated probability. That is, for example, the confirmed value deriving unit 22*b* calculates a probability for each assumed photon number when the target pixel indicates the provisional value based on following Expression (4) while changing the assumed photon number of the target pixel and outputs a value of the assumed photon number k when the probability is the highest as a confirmed value of the photon number. In Expression (4), $Q_k$ is the first probability, that is, a probability with which the photon number of the target pixel is observed to be k and which is derived based on the probability distribution of the photon number. A range of the assumed photon number k calculated by the confirmed value deriving unit 22*b* may be a data range of the probability distribution of the photon number. That is, the range may be a range of the provisional photon number acquired when the probability distribution of the photon number is derived. The range of the assumed photon number k calculated by the confirmed value deriving unit 22*b* may be a predetermined range corresponding to the provisional value of the target pixel.

[Math. 4]

$$P_k(x) = Q_k \times \frac{1}{\sqrt{2\pi}R}\exp\left(-\frac{(x-k)^2}{2R^2}\right) \tag{4}$$

As described above, the confirmed value deriving unit 22*b* derives a most probable photon number in the target pixel as the confirmed value of the target pixel using provisional values of neighboring pixels as a clue.

The confirmed value deriving unit 22*b* may derive a photon number of which an error from a true photon number is considered to be minimized as the confirmed value. That is, the confirmed value deriving unit 22*b* may derive an expected value of the photon number as the confirmed value. For example, the confirmed value deriving unit 22*b* can derive the expected value of the photon number of the target pixel based on the first probability and the second probability, where the first probability is an observation probability for each photoelectron number in the target pixel based on the probability distribution of the photon number and the second probability is an observation probability for each photoelectron number with the provisional value of the target pixel based on the probability distribution of the photoelectron number accompanying the reading noise of the target pixel. For example, when the probability for each assumed photon number when the target pixel indicates the provisional value is represented by Expression (4), the expected value $k_{exp}$ of the photon number is expressed by following Expression (5). The range of the assumed photon number k calculated by the confirmed value deriving unit 22*b* may be a data range of the probability distribution of the photon number. That is, the range may be a range of the provisional photon number acquired when the probability distribution of the photon number is derived. The range of the assumed photon number k calculated by the confirmed value deriving unit 22*b* may be a predetermined range corresponding to the provisional value of the target pixel.

[Math. 5]

$$k_{exp} = \frac{\sum_k k \times P_k(x)}{\sum_k P_k(x)} \tag{5}$$

Figure 3:
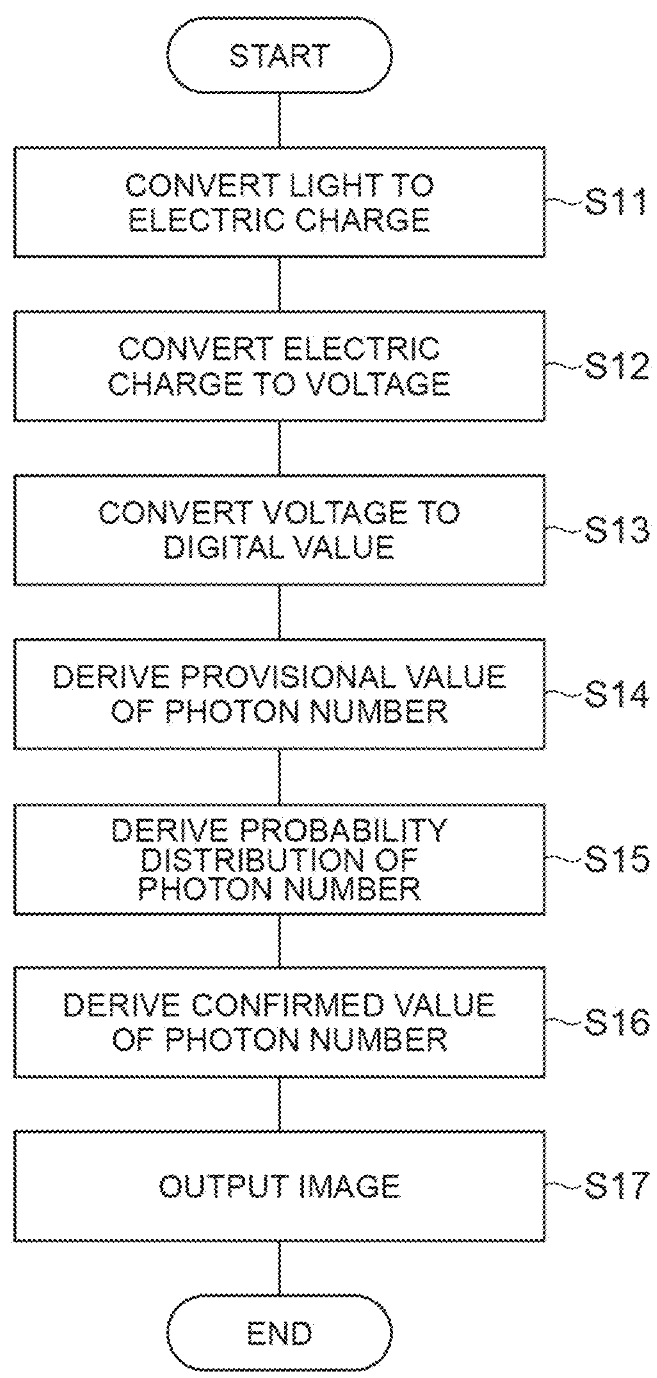
FIG. 3 is a flowchart illustrating an operation flow that is performed by the photon number resolving device according to the example.

FIG. 3 is a flowchart illustrating an operation (a photon number resolving method) of the photon number resolving device. In this embodiment, when measurement is started in a state in which the photon number resolving device 1 is activated, first, photons incident on a pixel 11 of the CMOS image sensor 10 are converted to electric charges by the corresponding photodiode 12 (Step S11). Then, the converted electric charges are converted to a voltage by the amplifier 13 (Step S12). The voltage is converted to a digital value by the A/D converter 15 and is output to the computer 20 (Step S13). The provisional value deriving unit 22*a* of the conversion unit 22 derives a provisional value from the digital value based on a gain and an offset value of each pixel acquired with reference to the table in the storage unit 21 (Step S14). The derived provisional value may be stored, for example, in the storage unit 21. The confirmed value deriving unit 22*b* derives a probability distribution of a photon number based on the provisional value (for example, a provisional photon number) of a reference pixel (Step S15). That is, the confirmed value deriving unit 22*b* acquires data of the reference pixel from the data of the provisional values of the pixels stored in the storage unit 21 and derives the probability distribution of the photon number based on the acquired data.

Subsequently, the confirmed value deriving unit 22*b* derives a confirmed value of the photon number in each pixel based on the first probability and the second probability (Step S16). As described above, the first probability is derived based on the probability distribution of the photon number, and the second probability is derived based on the provisional value and reading noise of a target pixel. In this way, the photon number for each of a plurality of pixels is measured. The measurement result (photon number resolving data) is output, for example, as image data to the display device 25 (Step S17).

Figure 4:
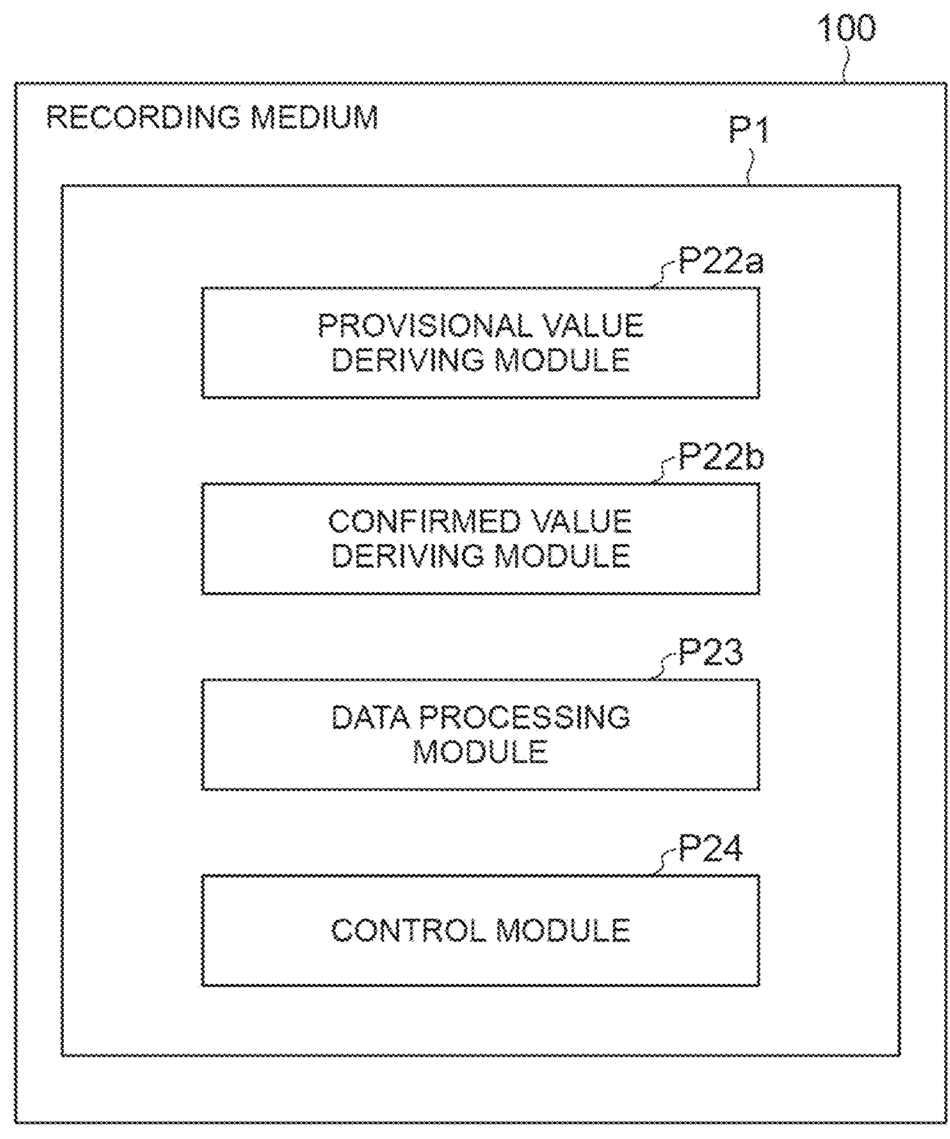
FIG. 4 is a diagram illustrating a photon number resolving processing program.

FIG. 4 is a diagram illustrating a recording medium 100 in which a program causing a computer to perform a photon number resolving process is stored. A photon number resolving processing program P1 stored in the recording medium 100 includes a provisional value deriving model P22*a*, a confirmed value deriving module P22*b*, a data processing module P23, and a control module P24. Functions (processes) which are realized by executing the provisional value deriving model P22*a*, the confirmed value deriving module P22*b*, the data processing module P23, and the control module P24 are the same as the functions (processes) of the provisional value deriving unit 22*a* (a first deriving process), the confirmed value deriving unit 22*b* (a second deriving process), the data processing unit 23, and the control unit 24.

The photon number resolving processing program P1 is recorded in a program recording area of a computer-readable recording medium 100. The recording medium 100 may be a non-transitory recording medium. The recording medium 100 is constituted, for example, by a recording medium such as a CD-ROM, a DVD, a ROM, or a semiconductor memory. The photon number resolving processing program P1 may be provided as a computer data signal superimposed on a carrier via a communication network.

Figure 5:
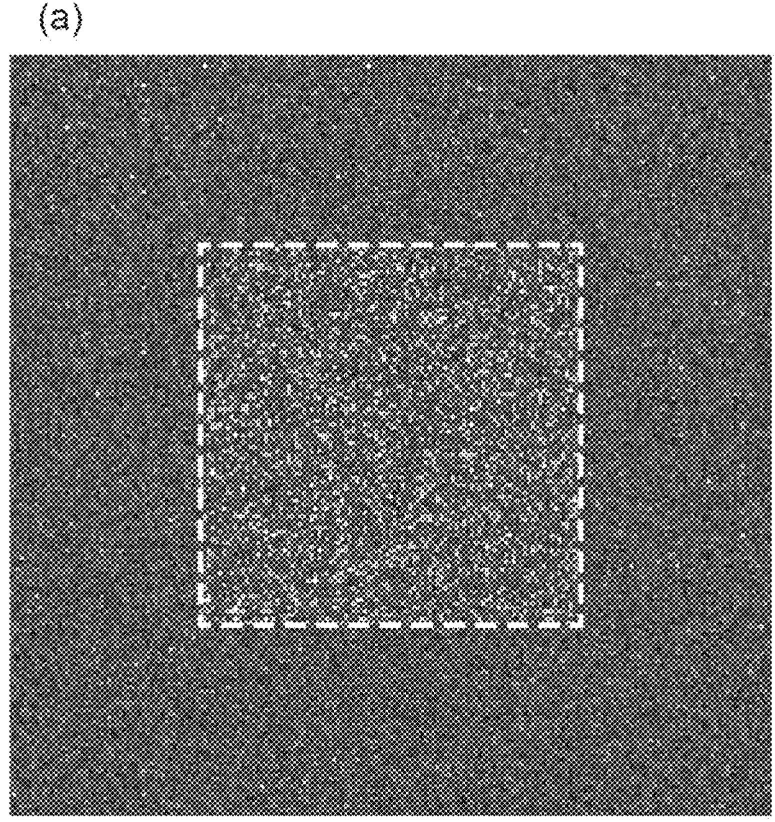
FIG. 5 is a diagram illustrating a photon number resolving result according to an example.
Figure 5:
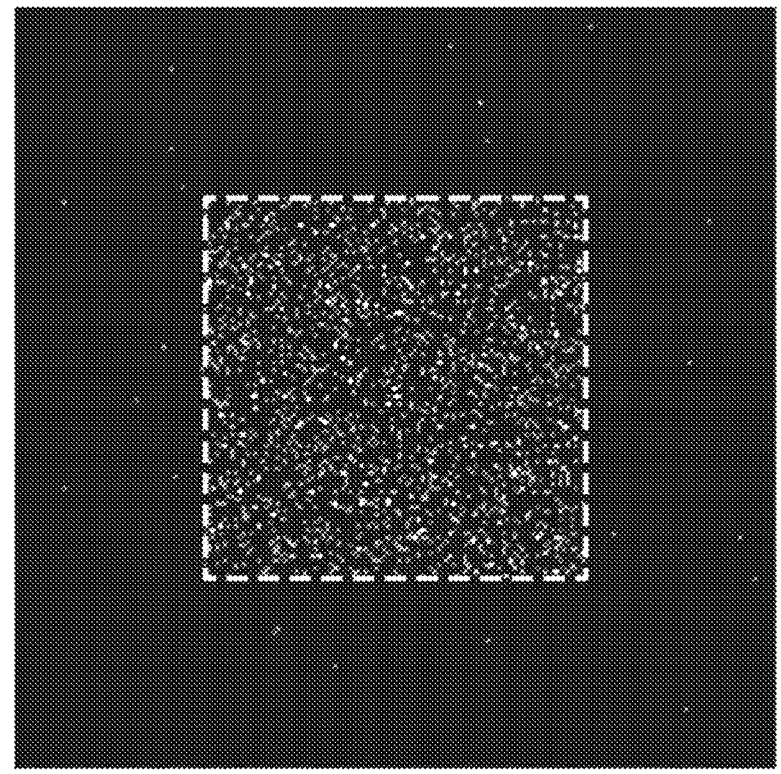
Figure 6:
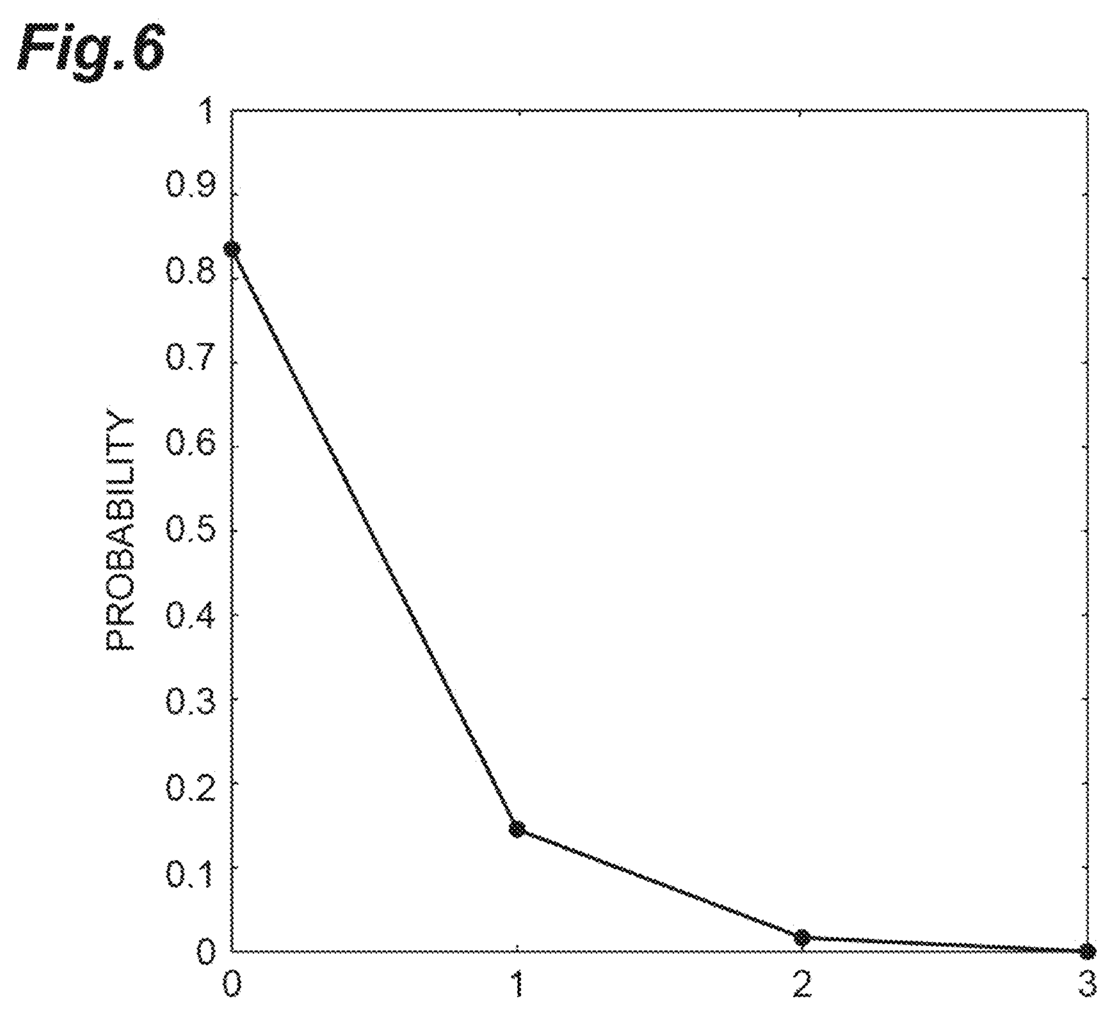
FIG. 6 is a diagram illustrating a photon number resolving result according to an example.

FIGS. 5 and 6 are diagrams illustrating examples of an output result of the photon number resolving device according to the example. (a) of FIG. 5 is an image which is formed based on a digital value by the photon number resolving device. The image has luminance corresponding to the digital value. In (a) of FIG. 5, an area surrounded by a dotted line is irradiated with uniform light from the light source 30 which is a quantum light source. An area outside of the dotted line is not irradiated with light from the light source 30. (b) of FIG. 5 is an image which is formed based on a confirmed value by the photon number resolving device. The image has luminance based on the confirmed value. Noise in the area outside of the dotted line which is not irradiated with light from the light source 30 decreases, and signals in the dotted line are clearer.

FIG. 6 is a diagram illustrating an example of a probability distribution of a photon number. FIG. 6 is derived based on a provisional photon number of a reference pixel in the area surrounded with the dotted line in (a) of FIG. 5. More specifically, for example, data of a provisional photon number corresponding to 500 frames in 10 arbitrary pixels out of the reference pixels in the dotted line is acquired, and a probability for each provisional photon number is derived using a total of 5000 pieces of data as a sample. Reading noise of the reference pixel is equal to or less than 0.18 [e-rms]. Since the provisional photon number measured with the reference pixels in the dotted line is one of 0 to 3, a data range of the probability distribution of the photon number in FIG. 6 includes 0, 1, 2, and 3. The probability distribution of FIG. 6 is used to derive a confirmed value of a pixel in the dotted line in (a) of FIG. 5. The probability distribution of the photon number (not illustrated) for deriving the confirmed value of a pixel outside of the dotted line in (a) of FIG. 5 is derived based on the provisional photon number of the reference pixels outside of the dotted line in (a) of FIG. 5.

As described above, the photon number resolving device 1 according to an example includes: a plurality of pixels 11 of which each includes a photodiode 12 for converting input light to electric charges and an amplifier 13 for amplifying the electric charges converted by the photodiode 12 and converting the electric charges to a voltage; an A/D converter 15 configured to convert a voltage output from the amplifier 13 of each of the plurality of pixels 11 to a digital value; a provisional value deriving unit 22*a* configured to derive a provisional value of a photon number in each pixel 11 of the plurality of pixels 11 based on the digital value; and a confirmed value deriving unit 22*b* configured to derive a confirmed value of the photon number in a target pixel which is one of the plurality of pixels 11 based on a first probability and a second probability. The first probability is an observation probability for each photoelectron number in the target pixel based on a probability distribution of the photon number. The probability distribution of the photon number is derived based on the digital value when the light is input to a reference pixel which is at least one of the plurality of pixels 11. The second probability is an observation probability for each photoelectron number at the provisional value of the target pixel based on a probability distribution of a photoelectron number accompanying reading noise in the target pixel.

In the photon number resolving device 1, the provisional value deriving unit 22*a* derives the provisional value of the photon number in each pixel 11 based on the magnitude of the digital value corresponding to an amount of electric charges generated in the corresponding pixel 11. For example, in a pixel with large reading noise, an error included in the derived provisional value may increase. The confirmed value deriving unit 22*b* derives the confirmed value of the photon number when the target pixel indicates the provisional value based on a probability distribution of the photon number derived based on the digital value of the reference pixel and the probability distribution of the photoelectron number accompanying the reading noise. In this way, the confirmed value of the photon number is derived in consideration of the magnitude of the reading noise in the target pixel. Accordingly, since an influence of the reading noise on deriving of the confirmed value can be decreased, it is possible to improve accuracy of photon number resolving.

In the photon number resolving device 1, since the probability distribution of the photon number is derived based on the digital value of the reference pixel, an appropriate probability distribution corresponding to optical characteristics of the light source 30 is derived.

For example, in the photon number resolving device 1, the reading noise of the reference pixel may be smaller than an average of the reading noise of all the plurality of pixels. For example, the reading noise of the reference pixel may be equal to or less than 0.8 e-rms. With this configuration, since the digital value of the reference pixel reflects the photon number with relatively high accuracy, it is possible to enhance reliability of the probability distribution of the photon number.

For example, in the photon number resolving device 1, the light input to the CMOS image sensor 10 may be output from a quantum light source. With this configuration, the first probability reflects characteristics of the quantum light source. In photon number resolving using the quantum light source, photons having unique features or behavior of quantum such as duality, superposition, and quantum entanglement can be observed.

For example, in the photon number resolving device 1, the confirmed value deriving unit 22*b* may calculate a probability for each photoelectron number when the target pixel indicates the provisional value using a product of the first probability and the second probability and determine the confirmed value based on the calculated probability. With this configuration, it is possible to obtain a most probable photon number by using the photoelectron number with a maximum value of the probability for each photoelectron number when the target pixel indicates the provisional value as the confirmed value. By using an expected value of the photoelectron number when the target pixel indicates the provisional value as the confirmed value, it is possible to obtain the photon number of which an error from a true photon number is minimized.

For example, in the photon number resolving device 1, a probability distribution of the photoelectron number accompanying the reading noise of the target pixel may be a normal distribution. With this configuration, the probability distribution of the photoelectron number accompanying the reading noise can be appropriately described.

For example, in the photon number resolving device 1, the confirmed value deriving unit 22*b* may include a noise map indicating the reading noise of each of the plurality of pixels. That is, the confirmed value deriving unit 22*b* may derive the second probability with reference to data including the noise map. The reference pixel may be determined with reference to the data based on the noise map.

While an embodiment has been described above in detail with reference to the drawings, a specific configuration is not limited to the embodiment.

For example, an example in which a probability distribution of a photon number is derived based on a provisional value of a reference pixel satisfying conditions of reading noise has been described above, but the probability distribution of the photon number may be derived based on a provisional value of another arbitrary pixel. For example, the probability distribution of the photon number may be calculated based on the provisional values of all the pixels constituting the CMOS image sensor.

An example in which the probability distribution of the photon number derived by the confirmed value deriving unit 22*b* is used to derive the confirmed value without any change, but the derived probability distribution of the photon number may be approximated to, for example, an arbitrary distribution, function, or the like. In this case, the range of the assumed photon number calculated by the confirmed value deriving unit may be set such that a total sum of the observation probabilities is equal to or greater than a predetermined value (for example, equal to or greater than 0.99).

REFERENCE SIGNS LIST

1 . . . Photon number resolving device, 11 . . . Pixel, 12 . . . Photodiode (photoelectric conversion element), 13 . . . Amplifier, 15 . . . A/D converter, 21 . . . Storage unit, 22*a* . . . Provisional value deriving unit (first deriving unit), 22*b* . . . Confirmed value deriving unit (second deriving unit)

The invention claimed is:

1. A photon number resolving system comprising:

a plurality of pixels of which each includes a photoelectric conversion element for converting input light to electric charges and an amplifier for amplifying the electric charges converted by the photoelectric conversion element and converting the electric charges to a voltage;

an A/D converter configured to convert a voltage output from the amplifier of each of the plurality of pixels to a digital value; and a computing device comprising a first derivation unit and a second derivation unit, wherein:

the first deriving unit of the computing device configured to derive a provisional value of a photon number in each of the plurality of pixels based on the digital value; and the second deriving unit of the computing device configured to derive a confirmed value of a photon number in a target pixel which is one of the plurality of pixels based on a first probability and a second probability, wherein the first probability is an observation probability for each photoelectron number in the target pixel based on a probability distribution of the photon number, wherein the probability distribution of the photon number is derived based on the digital value when the light is input to a reference pixel which is at least one of the plurality of pixels, wherein the second probability is an observation probability for each photoelectron number at the provisional value of the target pixel based on a probability distribution of a photoelectron number accompanying reading noise in the target pixel, wherein the first deriving unit derives the provisional value of photon number from the digital value based on threshold value data, and wherein the second derivation unit calculates a probability for each photoelectron number when the target pixel indicates the provisional value by calculating a product of the first probability and the second probability and determines the confirmed value based on the calculated probability.

2. The photon number resolving system according to claim 1, wherein the reading noise of the reference pixel is smaller than an average of the reading noise of all the plurality of pixels.

3. The photon number resolving system according to claim 1, wherein the reading noise of the reference pixel is equal to or less than 0.8 e-rms.

4. The photon number resolving system according to claim 1, wherein the light is output from a quantum light source.

5. The photon number resolving system according to claim 1, wherein a probability distribution of the photoelectron number accompanying the reading noise of the target pixel is a normal distribution.

6. The photon number resolving system according to claim 1, wherein the second deriving unit includes a noise map indicating the reading noise of each of the plurality of pixels.

7. A photon number resolving method comprising:

deriving a provisional value of a photon number in each of a plurality of pixels based on digital values corresponding to the plurality of pixels output from a two-dimensional image sensor including the plurality of pixels; and deriving a confirmed value of the photon number in a target pixel which is one of the plurality of pixels based on a first probability and a second probability, wherein the deriving of the confirmed value includes calculating an observation probability for each photoelectron number in the target pixel based on a probability distribution of the photon number as the first probability, and calculating an observation probability for each photoelectron number at the provisional value of the target pixel as the second probability based on a probability distribution of the photoelectron number accompanying the reading noise of the target pixel, wherein the probability distribution of the photon number is derived based on the digital value when light is input to a reference pixel which is at least one of the plurality of pixels, wherein the deriving of the provisional value of photon number includes deriving the provisional value of photon number from the digital value based on threshold value data, and wherein the deriving of the confirmed value includes calculating a probability for each photoelectron number when the target pixel indicates the provisional value by calculating a product of the first probability and the second probability and determining the confirmed value based on the calculated probability.

8. The photon number resolving method according to claim 7, wherein the reading noise of the reference pixel is smaller than an average of the reading noise of all the plurality of pixels.

9. The photon number resolving method according to claim 7, wherein the reading noise of the reference pixel is equal to or less than 0.8 e-rms.

10. The photon number resolving method according to claim 7, wherein the light is output from a quantum light source.

11. The photon number resolving method according to claim 7, wherein the deriving of the confirmed value includes calculating a probability for each photoelectron number when the target pixel indicates the provisional value using a product of the first probability and the second probability and determining the confirmed value based on the calculated probability.

12. The photon number resolving method according to claim 7, wherein the deriving of the confirmed value uses a normal distribution as a probability distribution of the photoelectron number accompanying the reading noise of the target pixel.

13. The photon number resolving method according to claim 7, wherein the deriving of the confirmed value includes referring to a noise map indicating the reading noise of each of the plurality of pixels.

14. A photon number resolving program, stored on a non-transitory storage medium, for causing a computer to perform a process of resolving a photon number based on digital values corresponding to a plurality of pixels output from a two-dimensional image sensor including the plurality of pixels, the program causing the computer to perform:

a first deriving process of deriving a provisional value of a photon number in each of a plurality of pixels based on the digital values; and a second deriving process of deriving a confirmed value of the photon number in a target pixel which is one of the plurality of pixels based on a first probability and a second probability, wherein the first probability is an observation probability for each photoelectron number in the target pixel based on a probability distribution of the photon number, wherein the probability distribution of the photon number is derived based on the digital value when the light is input to a reference pixel which is at least one of the plurality of pixels, and wherein the second probability is an observation probability for each photoelectron number at the provisional value of the target pixel based on a probability distribution of a photoelectron number accompanying reading noise in the target pixel, wherein the first derivation process derives the provisional value of photon number from the digital value based on threshold value data, and wherein the second derivation process calculates a probability for each photoelectron number when the target pixel indicates the provisional value by calculating a product of the first probability and the second probability and determines the confirmed value of photon number based on the calculated probability.

* * * * *